United States Patent Office 3,632,594
Patented Jan. 4, 1972

3,632,594
NEW N-SUBSTITUTED DI-AMIDINES DERIVED FROM AROMATIC DIAMINES AND A PROCESS FOR THEIR PREPARATION
Jean Albert Gautier, Marcel Miocque, and Claude Fauran, Paris, and Albert Yves Le Cloarec, Saint-Maur, France, assignors to Delande S.A., Courbevoie, Hauts-de-Seine, France
No Drawing. Filed July 11, 1968, Ser. No. 743,957
Claims priority, application Great Britain, July 14, 1967, 32,427/67
Int. Cl. C07c *123/00*
U.S. Cl. 260—296 R    7 Claims

ABSTRACT OF THE DISCLOSURE

N-substituted diamidines of the formula

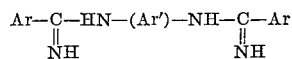

in which Ar is an unsubstituted phenyl radical or a phenyl radical substituted by one or more halogen atoms, by an alkyl radical having one to four carbon atoms, or by one or more ether-oxide groups of the formula O—R in which R=—CH$_3$, —C$_2$H$_5$ or —C$_3$H$_7$; an unsubstituted or substituted naphthyl radical or a heterocyclic radical such as a pyridine radical, and Ar' is an unsubstituted phenyl radical, the two —NH radicals between which the phenyl radical is situated may be attached to the phenyl radical in the 1–2, 1–3 or 1–4 positions, and which phenyl radical may be substituted by a halogen atom or a methoxy radical, the respective positions of these substituents being capable of being as above; or a naphthyl radical, the two—NH radicals between which the naphthyl radical is situated, preferably being attached to the naphthyl radical in the 1–5 position.

---

The process of preparing the diamidines comprises reacting an aromatic diamine with an aromatic nitrile using an alkaline amide as a condensation agent, the reaction being carried out in liquid ammonia.

The diamidines are useful as analgesic agents, anti-inflammatory agents and antihypertensive agents.

The present invention concerns new N-substituted di-amidines derived from aromatic diamines and a process for their preparation.

The new compounds of the present invention correspond to the general formula:

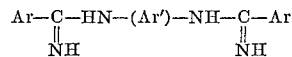

in which Ar is an unsubstituted phenyl radical or a phenyl radical substituted by one or more halogen atoms, by an alkyl radical having one to four carbon atoms, or by one or more ether-oxide groups of the formula O—R in which R=—CH$_3$, —C$_2$H$_5$ or —C$_3$H$_7$; an unsubstituted or substituted naphthyl radical or a heterocyclic radical such as a pyridine radical, and Ar' is an unsubstituted phenyl radical, the two —NH radicals between which the phenyl radical is situated may be attached to the phenyl radical in the 1–2, 1–3 or 1–4 positions, and which phenyl radical may be substituted by a halogen atom or a methoxy radical, the respective positions of these substituents being capable of being as above; or a naphthyl radical, the two —NH radicals between which the naphthyl radical is situated, preferably being attached to the naphthyl radical in the 1–5 position.

It is known that the functional group of N-substituted amidines is generally produced by the reaction of a nitrile with an aromatic amine, but the processes usually employed comprise relatively difficult operating conditions, e.g. high reaction temperatures, and the use of condensation agents such as aluminium chloride or sodium which are capable of attacking the various substituents of the aromatic nuclei. Moreover, in the case of N-substituted di-amidines, few described examples of which exist, these known processes frequently result in the production of resinous reaction mixtures, from which it is difficult to extract the desired product.

The process of obtaining the new diamidines forming the object of the invention in high yields is based on a new method of preparing the amidine group which, in the present case, comprises reacting an aromatic diamine with an aromatic nitrile, using, as condensation agent, an alkaline amide (most frequently sodium amide) and by carrying out the reaction in liquid ammonia. This method may be represented by the following equation:

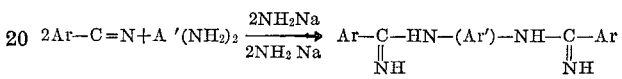

where Ar and Ar' are as defined above.

The general method of preparation of the compounds according to the present invention is as follows:

0.1 mol of the diamine Ar' (NH$_2$)$_2$ (in solid form) is added to a suspension of 0.2 mol of sodium amide in 400 ml. of liquid ammonia. After 3 hours under agitation. 0.2 mol of the nitrile Ar C≡N (also in solid form) is added thereto. Agitation is continued under reflux for 3 hours. Then 0.2 mol of NH$_4$Cl is added and the ammonia is removed by evaporation. The dry residue is taken up in 150 ml. water and extracted 3 times with ether or ethyl acetate. After evaporation of the solvent, a crystallised residue is obtained. The di-amidines obtained, when dissolved in an organic solvent and treated with a mineral or organic acid, give crystallised di-salts having definite melting points.

The following non-limitative examples illustrate the preparation of compounds according to the present invention:

EXAMPLE 1.—Bis-1,5-benzamidino-naphthalene

Several crystals of ferric nitrate and 4.7 g. (0.2 atom-gram) of sodium are introduced into 350 ml. of liquid ammonia and a grey suspension of sodium amide is obtained. 15 g. of 1,5-diamino naphthalene are added thereto and the mixture is agitated for 3 hours. An ether solution of 20 g. of benzonitrile is then introduced and agitation is continued under reflux for 3 hours.

The mixture is then treated with ammonium chloride, the solvent is removed by evaporation, and the residue is taken up in 500 ml. of water. The precipitate which forms is drained, washed with water and dried and recrystallised in dimethyl formamide.

Yield=66%. Melting point >250° C.

*Elementary analysis.*—Calculated (percent): C, 79.09; H, 5.53; N, 15.38. Found (percent): C, 78.95; H, 5.72; N, 15.45.

EXAMPLE 2.—Bis-1,4-(α-naphthylamidino) benzene 10.8 g. of p-phenylenediamine is added to a suspension of 0.2 mol of sodium amide in liquid ammonia and the mixture is agitated for 3 hours. 30.6 g. of α-naphthonitrile are then added and agitation under reflux is continued for 3 hours during which time the mixture turns green. Ammonium chloride is then added and the solvent is evaporated. The residue is taken up in 500 ml. of water and the precipitate which is formed is drained, washed with water and recrystallised in dioxan.

Yield=75%. Melting point >250° C.

*Elementary analysis.*—Calculated (percent): C, 81.13; H, 5.35; N, 13.52. Found (percent): C, 80.87; H, 5.44; N, 13.44.

EXAMPLE 3.—Bis-1,2-(m-pyridylamidino) benzene 0.1 mol of o-phenylenediamine is added to a suspension of sodium amide in liquid ammonia and after agitation for 3 hours, 20.8 g. of m-cyanopyridine is added thereto. Agitation under reflux is continued for 3 hours. After removal of the solvent and hydrolysis a precipitate is obtained which is drained, washed, dried and recrystallised in dimethyl formamide.

Yield=29%. Melting point=258° C.

*Elementary analysis.*—Calculated (percent): C, 68.33; H, 5.10; N, 26.57. Found (percent): C, 68.55; H, 4.97; N, 26.72.

EXAMPLE 4.—Bis-1,2-(p-pyridylamidino) benzene 10.8 g. of o-phenylenediamine are added to a suspension of sodium amide in liquid ammonia and after 3 hours under agitation, 20.8 g. of p-cyanopyridine are added thereto. The mixture is agitated under reflux for 3 hours and after removal of the solvent and hydrolysis the precipitate obtained is filtered, drained, washed and dried and is then recrystallised in an acetone-petroleum ether mixture.

Yield=61%. Melting point =148° C.

*Elementary analysis.*—Calculated (percent): C, 68.33; H, 5.10; N, 26.57. Found (percent): C, 68.31; H, 5.33; N, 26.74.

Compounds of the present invention which have been prepared according to the process described and illustrated in the above examples are set out in the following tables.

TABLE I

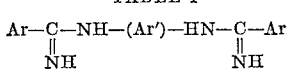

TABLE II

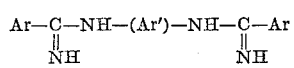

The compounds of the present invention have been tested on animals in the laboratory and have shown in general:

(a) an analgesic action which shows itself by an inhibition of the provoked stretching caused by an intraperitioneal injection of phenylbenzoquinone in the mouse;

(b) antiinflammatory action characterised by an inhibition of the Oedema under Plantar with carragenine in the rat; and (c) an antihypertensive action observed in the rat during chronic hypertension experiments.

For use in human therapy, the compounds according to invention can be prepared in the form of compressed tablets containing dosages of 20, 50 or 100 mg. of the compound and the tablets can be administered at a rate of 1 to 5 tablets per day.

What we claim is:

1. A compound of the formula

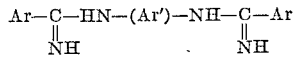

in which Ar is selected from the group consisting of phenyl, chlorophenyl, naphthyl and pyridyl, and
Ar' is selected from the group consisting of naphthylene and phenylene,
and the dihydrochloride acid addition salts thereof.

2. A compound according to claim 1, in which when Ar' is phenylene, the two —NH radicals are attached to the phenyl nucleus in the 1–2, 1–3 or 1–4 positions.

3. A compound according to claim 1, in which when Ar' is naphthylene, the two —NH radicals are attached to the naphthyl nucleus in the 1–5 positions.

4. A compound according to claim 1, in which Ar is selected from the group consisting of m-pyridyl and p-pyridyl.

5. A compound according to claim 1, in which Ar is α-naphthyl.

6. A compound according to claim 1, in which Ar is o-chlorophenyl.

7. A process for the preparation of diamidines which comprises adding to a suspension of sodium amide in liquid ammonia a diamine of the formula Ar'(NH$_2$)$_2$, wherein Ar' is selected from the group consisting of naphthylene and phenylene and then adding to the reaction mixture a nitrile of the formula Ar —C≡N, wherein Ar is selected from the group consisting of phenyl, chlorophenyl, naphthyl and pyridyl, and reacting said diamine with said nitrile to form a diamidine of the formula

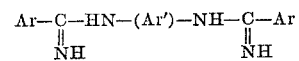

References Cited
UNITED STATES PATENTS

| | | | |
|---|---|---|---|
| 2,049,582 | 8/1936 | Ziegler | 260—127 |
| 2,364,200 | 12/1944 | Ewins et al. | 260—564 |
| 2,375,740 | 5/1945 | Barber et al. | 260—564 |
| 3,105,853 | 10/1963 | McKay et al. | 260—564 |

BERNARD HELFIN, Primary Examiner

G. A. SCHWARTZ, Assistant Examiner

U.S. Cl. X.R.

260—564 R, 999